July 22, 1952 M. A. GLEESON 2,604,201
CONVEYER SWIVEL JOINT
Filed Aug. 6, 1951 2 SHEETS—SHEET 1
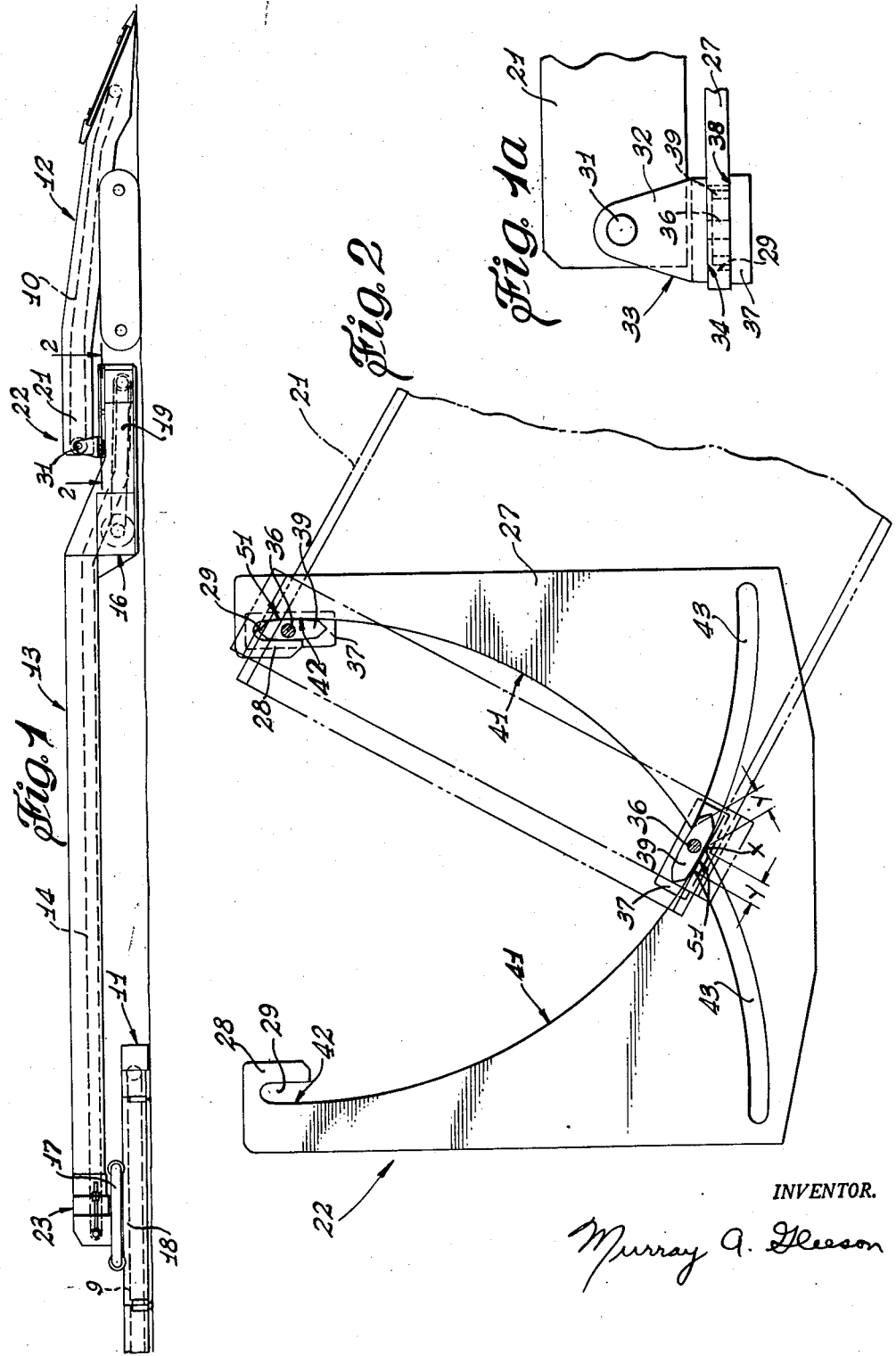
INVENTOR.
Murray A. Gleeson July 22, 1952  M. A. GLEESON  2,604,201
CONVEYER SWIVEL JOINT
Filed Aug. 6, 1951  2 SHEETS—SHEET 2

INVENTOR.
Murray A. Gleeson

Patented July 22, 1952

2,604,201

UNITED STATES PATENT OFFICE 2,604,201

CONVEYER SWIVEL JOINT

Murray A. Gleeson, Chicago, Ill., assignor to Goodman Manufacturing Company, Chicago, Ill., a corporation of Illinois Application August 6, 1951, Serial No. 240,479

4 Claims. (Cl. 198—95)

This invention relates generally to conveyors and more particularly to swivel joints for endless belt or chain type conveyors. Still more particularly, the present invention is concerned with an improved swivel joint with 180 degree swing comprising upper and lower conveyors arranged in cascade relationship.

A primary object of the present invention is the prevention of accidental misalignment called "cross-tracking" in the type of underground mining equipment commonly known as a "Piggyback."

Other objects and advantages will be developed in the following description taken in connection with the drawings in which:

Figure 1 is a side view of a conventional "Piggyback" installation in which two 180 degree swivel joints, in accordance with the present invention, may be advantageously used;

Fig. 1a is a fragmentary enlarged view of Fig. 1;

Fig. 2 is an enlarged fragmentary plan view of one of the 180 degree swivels shown in Fig. 1.

Figure 3:
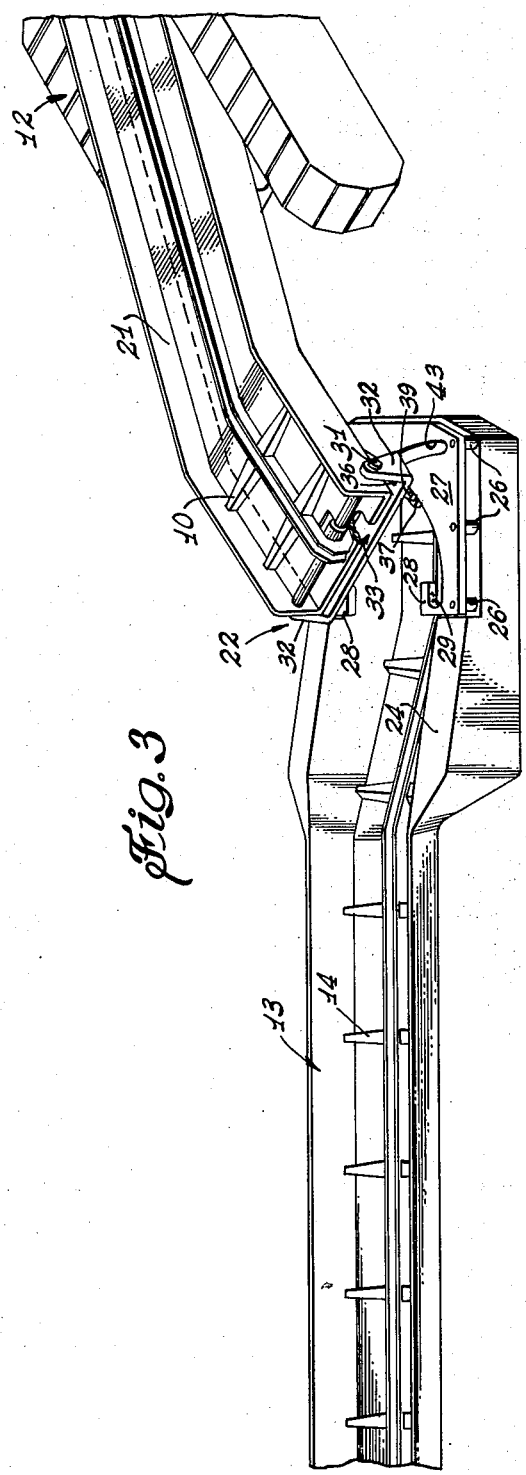
Fig. 3 is a fragmentary perspective view of the parts shown in Fig. 2.

Referring now more particularly to the drawings, the numeral 11 indicates a main belt conveyor extending into a room where a loading machine 12 is picking up coal or the like. The "Piggyback" 13 is a relatively short frame having an endless belt or chain conveyor 14 driven by motor means generally designated 16 and conveys coal from the loader 12 to the main conveyor 11, the "Piggyback" deriving its name from the fact that its discharge end is mounted on a wheeled dolly 17 which runs back and forth atop rails 18 along the sides of the main conveyor.

The transfer conveyor 13 (that is the "Piggyback") has its inby end 19 supported beneath the unloading boom 21 of the loading machine. There is a swivel joint, generally designated 22, between the loader and transfer conveyor permitting a full 180 degree swinging range between the loader and "Piggyback" conveyors 10 and 14 respectively while loading is being carried out; there is a similar swivel joint, generally designated 23, between the outby end of the "Piggyback" transfer conveyor and the dolly 17 permitting continuous transfer of material from the conveyor element 14 to the main belt 9.

The present invention relates to an improvement in the swivel joints 22 and 23. Since they may both be substantially the same in construction, only the swivel joint 22 will be described in detail.

At the inby end of the transfer conveyor 13 is a generally U-shaped hopper 24 and mounted on posts 26 on the upper side of the hopper is a guide plate 27 which has a pair of hook formations 28, 28 defining a pair of transversely spaced, longitudinally extending recesses 29, 29 formed in the plate.

Referring now to Figs. 1 and 3 it will be seen that the discharge boom 21 of the loader is pivoted as by means of pins 31, 31 onto a pair of upstanding ears 32, 32 of a U-shaped saddle member generally designated 33. The saddle member is assembled so that its bottom surface 34 (Fig. 1a) is slidably mounted across the top of the guide plate 27. A pair of pivot pins 36, 36 depend from the bottom of the saddle portion of the upper conveyor 21 and, as shown in Fig. 2, are transversely spaced a distance equal to the spacing of the recesses 29. At their bottom ends the pivot pins 36 carry a cross plate 37 whose upper surface 38 (Fig. 1a) is slidably engaged with the underside of the guide plate 27 so that the upper conveyor frame 21 may support the lower conveyor frame 19 above the ground at all times.

The crux of the present invention resides in providing a horizontally elongated guide shoe 39 pivotally mounted on each pin 36 to positively eliminate "cross-tracking" as will be explained subsequently.

Referring now back to the details of the guide plate 27, it is formed with a cam surface for each of the shoes 39 comprising a continuation of the outer surface 42 of the corresponding recess 29 and each cam surface 41 extends through at least a 90 degree arc struck from the pivotal axis of the other shoe when the latter is seated in its corresponding recess, as will be seen by examining Fig. 2. Each cam surface 41 extends beyond the juncture of the two cam surfaces (at X, Fig. 2) and continues in an elongated recess 43. For convenience in the subsequent description, the width of each of the recesses 43 is designated "Y".

The outer, cam-engaging surfaces 51 of the shoes 39 are preferably formed arcuately with a curve matching that of the cam surfaces 41 so as to fit stably thereagainst; furthermore, to facilitate entry into and egress from the recesses 43 at the juncture X, the opposite ends of the shoe 39 will preferably be narrowed, beveled, or pointed as best shown in Fig. 2.

Prior, conventional transfer conveyors of this general type have failed to utilize any equivalent of the pivotal shoes 39. They have attempted to function merely with the pins 36, 36 and it was found that quite often, when the two conveyors were turned at the intermediate angle shown in Fig. 2, the lower pin 36 would be inadvertently shifted into the left hand recess 43 thereby permitting the upper pin 36 to be shifted out of its holding recess 29 altogether, requiring a shut down while the parts were properly reassembled. This misalignment is referred to as "cross-tracking." Attempts have been made to eliminate this cross-tracking by making the recesses 29 in relatively large circular form, the recesses each having an open side located about where the open side is in the present recesses, and making the pivot pins 36 with a long narrow cross section extending across the circular recesses at a disposition which prevents their being pulled out of the recess at the time that cross tracking may occur. But this method has not been found entirely satisfactory because of the stress concentration on the edges of the pins causing rapid wear and in the relatively large space required by the circular recesses when made big enough to do their job.

It is believed that the operation of the present invention will be obvious from the foregoing disclosure. Briefly, however, when the right hand shoe 39 is seated in the right hand recess 29, as shown in Fig. 2, the upper discharge conveyor 21 at the rear of the loader 12 can swivel through a full arc of 90 degrees relative to the lower transfer conveyor 13, as the other shoe traverses the arcuate cam 41 from one end to the other. As the discharge conveyor 21 is swung through a straight-ahead position the left hand shoe 39 will be seated in the left hand recess 29 following which the conveyor 21 may be swung through another, opposite, 90 degree arc as the right hand shoe 39 traverses its corresponding cam 41.

The length of the shoes 39 will depend somewhat on the width of the openings Y for the recesses 43 and will be chosen long enough to properly bridge said openings Y as the shoes are moved across them. In order to properly stabilize the shoes 39 when they are seated in their respective recesses 29, the inner shoulders of the hook formations 28 should extend beyond the pivotal axis of the pins 36, so the shoes may not be shifted inadvertently out of their fulcrum position.

While one form in which the present invention may be embodied has been shown and described it will be understood that various modifications and variations thereof may be effected without departing from the spirit and scope of the invention as defined by the appended claims.

I claim:

1. A conveyor swivel joint with 180-degree swing comprising upper and lower conveyors arranged in cascade relationship; a guide plate; said lower conveyor being dependent from and supported by said guide plate; said guide plate having a pair of transversely spaced, longitudinally extending recesses formed therein; a pair of horizontally elongated shoes seatable in said recesses and pivoted about transversely spaced axes on the underside of said upper conveyor; said plate being formed with a cam surface for each of said shoes comprising a continuation of an outer surface of the corresponding recess and extending through at least a 90-degree arc struck from the pivotal axis of the other shoe when seated in its corresponding recess; said plate having an opening for the passage of material between said cam surfaces.

2. A conveyor swivel joint according to claim 1 in which said shoes have arcuate outer contours corresponding to that of said shoe-guiding cam surfaces formed in the guide plate.

3. A conveyor swivel joint according to claim 1 in which said shoes are formed with relatively narrowed leading edges.

4. A conveyor swivel joint according to claim 1 in which each of said shoe-receiving recesses is defined by inner and outer shoulders of sufficient length to overlap the pivotal axis of the corresponding shoe when the latter is seated in said recess to thereby stably support same therein.

MURRAY A. GLEESON.

REFERENCES CITED

The following references are of record in the file of this patent:

UNITED STATES PATENTS

| Number | Name | Date |
|---|---|---|
| 2,419,824 | Davis | Apr. 29, 1947 |
| 2,514,993 | Ernst | July 11, 1950 |